(12) United States Patent
Kwak et al.

(10) Patent No.: US 11,705,082 B1
(45) Date of Patent: Jul. 18, 2023

(54) METHOD FOR REDUCING OR ELIMINATING TEARING EFFECT OF AN IMAGE ON A DISPLAY OF WEARABLE COMPUTING DEVICE

(71) Applicant: Fitbit LLC, San Francisco, CA (US)

(72) Inventors: Dong Yeung Kwak, San Jose, CA (US); Valentin Tanase, Bucharest (RO); Ionel Lucian Banu, Bucharest (RO)

(73) Assignee: Fitbit LLC, San Francisco, CA (US)

( * ) Notice: Subject to any disclaimer, the term of this patent is extended or adjusted under 35 U.S.C. 154(b) by 0 days.

(21) Appl. No.: 17/474,283

(22) Filed: Sep. 14, 2021

(51) Int. Cl.
  *G09G 3/36* (2006.01)
  *G06F 1/16* (2006.01)

(52) U.S. Cl.
  CPC ........... *G09G 3/3618* (2013.01); *G06F 1/163* (2013.01)

(58) Field of Classification Search
  CPC ......... G09G 3/3618; G09G 2340/0492; G09G 5/393; G09G 5/395; G06F 1/163; G06T 3/606
  See application file for complete search history.

(56) References Cited

U.S. PATENT DOCUMENTS

| | | | |
|---|---|---|---|
| 8,982,139 B2 | 3/2015 | Chang | |
| 2006/0187239 A1 | 8/2006 | Clark-Lindh | |
| 2006/0238541 A1* | 10/2006 | Toni | G09G 5/395 |
| | | | 345/531 |
| 2007/0229482 A1 | 10/2007 | Morinaga et al. | |
| 2008/0129868 A1 | 6/2008 | Simpson | |
| 2017/0193971 A1 | 7/2017 | Bi et al. | |
| 2018/0139428 A1* | 5/2018 | Komiyama | H04N 5/268 |
| 2020/0320917 A1* | 10/2020 | Han | G09G 5/393 |
| 2022/0084482 A1* | 3/2022 | Chou | G06F 3/1407 |

FOREIGN PATENT DOCUMENTS

| | | |
|---|---|---|
| CN | 103137104 A | 6/2013 |
| EP | 1711934 | 10/2006 |

\* cited by examiner

*Primary Examiner* — Priyank J Shah
(74) *Attorney, Agent, or Firm* — Dority & Manning, P.A.

(57) ABSTRACT

A wearable computing device includes an outer covering, a housing, an electronic display configured to display an image, and a display drive integrated circuit (DDIC) comprising a processor and a memory device. The memory device(s) includes a blanking time programmed therein based on one or more parameters of the image and/or the DDIC, which generally refers to the time period in which the DDIC receives pixel data of the image from an external controller. The memory device stores instructions that when executed by the processor cause the processor to perform operations, including receiving an indication to rotate the image by a certain angle, upon receipt of the indication, starting to receive a transmission of the pixel data of the image from the external controller, and completing the transmission of the pixel data of the image during the blanking time and before the DDIC displays the image on the electronic display so as to avoid a tearing effect of the image on the electronic display.

18 Claims, 11 Drawing Sheets

METHOD FOR REDUCING OR ELIMINATING TEARING EFFECT OF AN IMAGE ON A DISPLAY OF WEARABLE COMPUTING DEVICE

FIELD

The present disclosure relates generally to wearable computing devices, and more particularly, to a method for reducing or eliminating a tearing effect of an image on an electronics display of a wearable computing device.

BACKGROUND

Recent advances in technology, including those available through consumer devices, have provided for corresponding advances in health detection and monitoring. For example, wearable devices, such as fitness trackers and smart watches, are able to determine information relating to the pulse or motion of a person wearing the device.

Such wearable devices are generally densely integrated gadgets with many key components (such a mobile phones, laptops, tablet computers, etc.) as such components typically include a System-on-a-Chip (SoC) (or application processor (AP)), one or more memory devices, Bluetooth® (BT), Wi-Fi, GPS, a microphone, a speaker, etc. In addition, wearable devices often contain many types of sensors inside and/or around the device. While wearable devices naturally require its identical ID within the thin and slim product design as an accessory industry product, nevertheless, the wearable device also needs to integrate additional key technologies and/or components in the limited housing space thereof. As a result of this trend, there is a strong demand for the thinner and slimmer components and the most optimized components layout design in the device.

For example, a display of a wearable device may include a ledge area for a touch flexible printed circuit (FPC) and/or chip-on-film (COF) bonding for a display drive integrated circuit (DDIC) to communicate and transfer data and/or protocol between a the DDIC, the touch integrated chip (IC), and the motherboard from an external controller (such as a processor of an associated mobile phone). Further, the DDIC and the touch FPC can be bent or folded along bending lines. In addition, the display can be built with a body or housing and a wearable band, such as a wristband, that can be worn by a user. Such displays may be a touch screen display that can rotate in various directions as the device is turned such that the user of the device can more easily view the image being displayed.

To rotate the display image by +90 degrees, as an example, there is an option feature that can be set or selected in the wearable device. More specifically, the DDIC of the wearable device generally offers the capability to change reading on rows or on columns. Unfortunately, the DDIC does not offer a possibility to exchange write data direction. As such, a tearing effect appears due to the fact that image data is written while the panel pixels are updated. For example, no matter the selected orientation, writing is completed on rows. If the reading is completed in the same direction (i.e., on rows), the tearing effect will not occur as reading will always charge pixels with new frame information. However, if the ordering from rows to columns for reading to obtain +/−90-degree rotation is changed, some parts of the panel will present new frame information/image, and the remaining panel will contain old frame information/image. Thus, in such instances, when the image is rotated 90-degrees, the tearing effect can appear on the display, in which the user perceives the image as "teared" because a visual artifact appears on the image due to information from multiple frames being shown in a single screen draw. The visual artifact typically occurs when the image feed to the wearable device is not in sync with the display's refresh rate.

In certain instances, to correct or avoid screen tearing, image rotation may be achieved by transmitting the rotated image from the SoC (AP). However, rotating the image on the SOC involves more processing power and more memory. Thus, in these instances, time, maximum frames per second (FPS), battery life, and application portability can be negatively impacted.

Furthermore, the DDIC has a blanking time and 1H time that are one-time programmable parameters. 1H time is the time that DDIC needs to refresh the pixels, whereas the blanking time is the time in which the DDIC of the wearable device receives pixel data of the image from the SOC. In the normal orientation, the writing of the DDIC overlaps the 1H time because the reading and writing were in the same direction. However, when rotating the device 90-degrees, it is impossible to write something in 1H time without tearing the image.

Accordingly, the present disclosure is directed to a wearable computing device having at least one processor configured to address the aforementioned issues. In particular, the processor(s) of the wearable computing device reduces or eliminates the tearing effect by starting transmission of the image pixels when the blanking time starts and ending the transmission before 1H time starts, such that the image is not displayed on the display until all of the image pixels are transferred.

SUMMARY

Aspects and advantages of embodiments of the present disclosure will be set forth in part in the following description, or can be learned from the description, or can be learned through practice of the embodiments.

One example aspect of the present disclosure is directed to a wearable computing device. The wearable computing device includes an outer covering, a housing, an electronic display arranged within the housing and configured to display an image viewable through the outer covering, and a display drive integrated circuit comprising one or more processors communicatively coupled to the electronic display and one or more memory devices storing instructions that when executed by the one or more processors cause the one or more processors to perform operations. The memory device(s) includes a blanking time programmed therein that is based on one or more parameters of at least one of the image or the display drive integrated circuit. The blanking time is a time period in which the display drive integrated circuit receives pixel data of the image from an external controller. The operations include receiving an indication to rotate the image on the electronics display by a certain angle, upon receipt of the indication, starting to receive a transmission of the pixel data of the image from the external controller, and completing the transmission of the pixel data of the image during the blanking time and before the display drive integrated circuit displays the image on the electronic display so as to avoid a tearing effect of the image on the electronic display.

In another aspect, the present disclosure is directed to a computer-implemented method for reducing or eliminating a tearing effect of an image on an electronics display of a wearable computing device. The wearable computing device has a display drive integrated circuit. The computer-implemented method includes receiving a blanking time for the display drive integrated circuit that is based on one or more parameters of at least one of the image or the display drive integrated circuit, wherein the blanking time is a time period in which the display drive integrated circuit receives pixel data of the image from an external controller. The computer-implemented method also includes receiving an indication to rotate the image on the electronics display by a certain angle. Further, the computer-implemented method includes, upon receipt of the indication, starting to receive a transmission of the pixel data of the image from the external controller. Moreover, the computer-implemented method includes completing the transmission of the pixel data of the image during the blanking time and before the display drive integrated circuit displays the image on the electronic display so as to avoid a tearing effect of the image on the electronic display.

In yet another aspect, the present disclosure is directed to one or more tangible, non-transitory, computer readable media that collectively store instructions that when executed by the one or more processors cause the one or more processors to perform operations. The operations includes receiving a blanking time for a display drive integrated circuit of a wearable computing device that is based on one or more parameters of at least one of an image or the display drive integrated circuit, wherein the blanking time is a time period in which the display drive integrated circuit receives pixel data of the image from an external controller, receiving an indication to rotate the image on an electronics display of the wearable computing device by a certain angle, upon receipt of the indication, starting to receive a transmission of the pixel data of the image from the external controller, and completing the transmission of the pixel data of the image during the blanking time and before the display drive integrated circuit displays the image on the electronic display so as to avoid a tearing effect of the image on the electronic display.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Overview

As mentioned, wearable devices are generally densely integrated gadgets with many key components (such a mobile phones, laptops, tablet computers, etc.) as such components typically include a System-on-a-Chip (SoC) (or application processor (AP)), one or more memory devices, Bluetooth® (BT), Wi-Fi, GPS, a microphone, a speaker, etc.

In addition, wearable devices often contain many types of sensors inside and/or around the device. While wearable devices naturally require its identical ID within the thin and slim product design as an accessory industry product from its birth, nevertheless, the device also needs to integrate additional new key technologies and/or components in the limited housing space thereof. As a result of this trend, there is a strong demand for the thinner and slimmer components and the most optimized components layout design in the device.

Figure 1A:
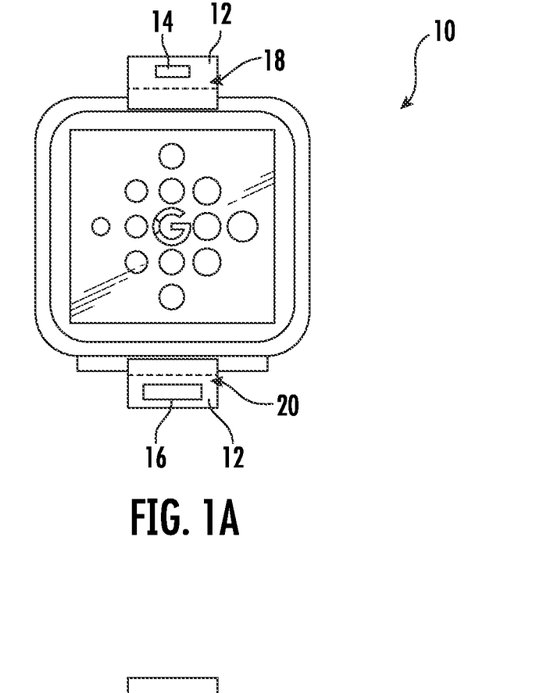
FIGS. 1A-1B provide front views of the various mechanical components of a wearable computing device according to one embodiment of the present disclosure.
Figure 1B:
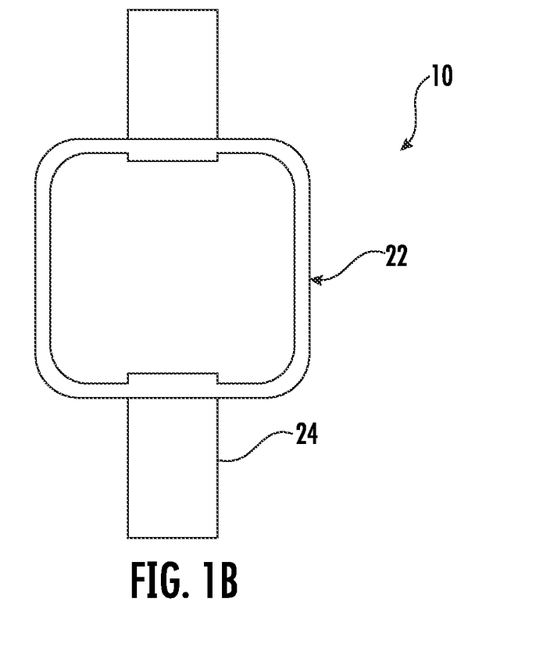

For example, as shown in FIG. 1A, an example display 10 for a wearable device is illustrated that includes a ledge area 12 for a touch flexible printed circuit (FPC) 14 and/or chip-on-film (COF) bonding for a display drive integrated circuit (DDIC) 16 to communicate and transfer data and/or protocol between a the DDIC 16, the touch integrated chip (IC), and the motherboard from an external controller (such as a processor of an associated mobile phone). Further, as shown, the DDIC 16 and the touch FPC 14 can be bent or folded along bending lines 18, 20. In addition, as shown in FIG. 1B, the display 10 of FIG. 1A can be built with a body or housing 22 and a wearable band 24, such as a wristband, that can be worn by a user.

Figure 2A:
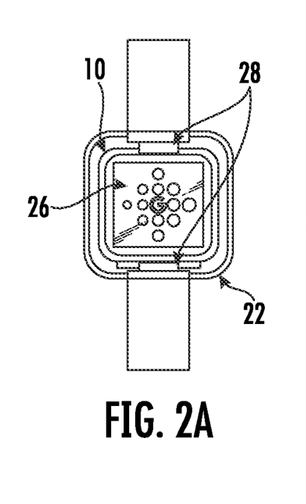
FIGS. 2A-2C provide multiple front views of a wearable computing device according to one embodiment of the present disclosure, particularly illustrating different display integration layouts in the housing of the wearable computing device.
Figure 2B:
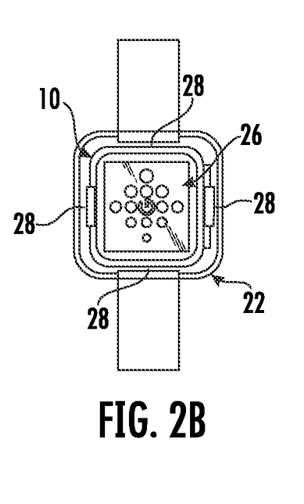
Figure 2C:
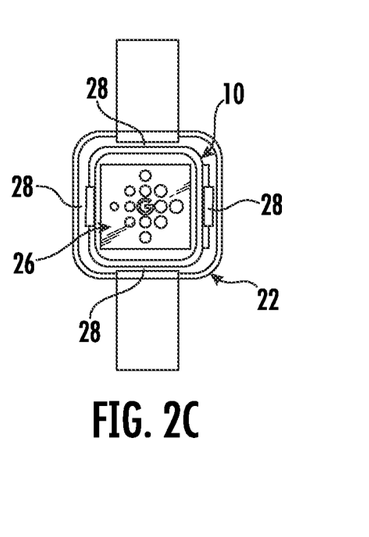

Such displays may be a touch screen display that can rotate in various directions as the device is turned such that the user of the device can more easily view the image being displayed. For example, referring to FIGS. 2A-2C, suitable and unsuitable display and housing integration layout designs are depicted. As shown in FIG. 2A, the image orientation 26 is suitable (i.e., in an upright position that can be easily viewed by the user). However, as shown in FIG. 2A, a mechanical gap 28 between the display 10 and the housing 22 is too narrow or overlapped, thereby potentially causing mechanical troubles or the active area screen size needs to become smaller to increase the gap size. As shown in FIG. 2B, the display 10 is rotated by negative (−) 90 degrees to reserve the mechanical gap 28, however, the image orientation 26 is also rotated, making the image difficult to view by the user. Therefore, as shown in FIG. 2C, the display 10 is rotated by negative (−) 90 degrees to obtain a comfortable design and the image orientation 26 is re-rotated to positive (+) 90 degrees to maintain the image in the correct orientation for the user.

To rotate the display image by +90 degrees, as an example, there is an option feature that can be set or selected in the wearable device. More specifically, the DDIC of the wearable device generally offers the capability to change reading on rows or on columns. Unfortunately, the DDIC does not offer a possibility to exchange write data direction. As such, a tearing effect appears due to the fact that image data is written while the panel pixels are updated. For example, no matter the selected orientation, writing is completed on rows. If the reading is completed in the same direction (i.e., on rows), the tearing effect will not occur as reading will always charge pixels with new frame information. However, if the ordering from rows to columns for reading to obtain +/−90-degree rotation is changed, some parts of the panel will present new frame information/image, and the remaining panel will contain old frame information/image. Thus, in such instances, when the image is rotated 90-degrees, the tearing effect (also referred to herein as screen tearing) can appear on the display, in which the user perceives the image as "teared" because a visual artifact appears on the image due to information from multiple frames being shown in a single screen draw. The visual artifact typically occurs when the image feed to the wearable device is not in sync with the display's refresh rate.

Figure 3:
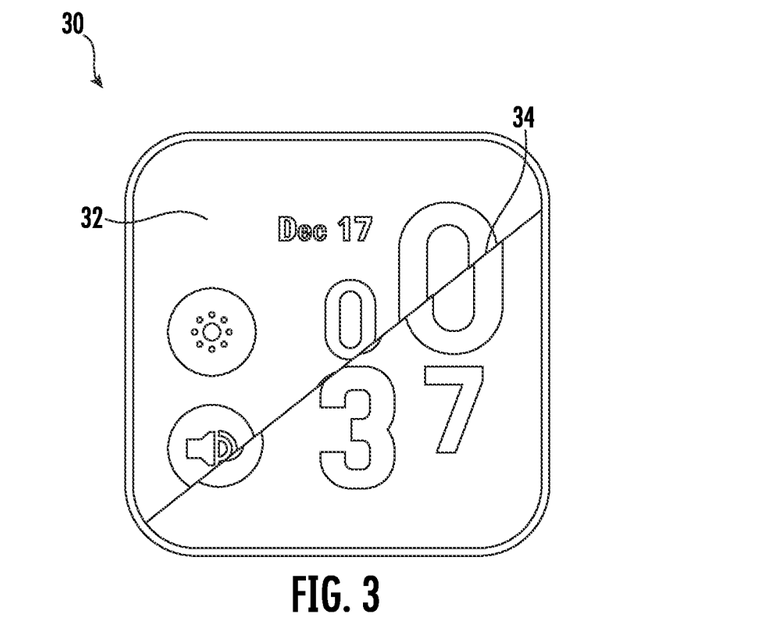
FIG. 3 provides a perspective view of a wearable computing device according to one embodiment of the present disclosure, particularly illustrating the tearing effect of the image on the display of the wearable computing device.

In other words, screen tearing is generally caused by the image data overlap between the current frame image data and the previous image data in some areas. Such an issue can be caused, for example, by non-matching refresh rates, and the tear line then moves as the phase difference changes (with speed proportional to difference of frame rates). Screen tearing can also occur from a lack of sync between two equal frame rates, in which case the tear line is then at a fixed location that corresponds to the phase difference. Thus, screen tearing creates a torn look as edges of objects fail to align. An example of the tearing effect is illustrated FIG. 3. In particular, as shown, a display 32 of a wearable device 30 is illustrated having broken lines 34 of "zero" character to illustrate the tearing effect.

In certain instances, to correct or avoid screen tearing, image rotation may be achieved by transmitting the rotated image from the SoC (AP). However, rotating the image on the SOC involves more processing power and more memory. Thus, in these instances, time, maximum frames per second (FPS), battery life, and application portability can be negatively impacted.

Furthermore, the DDIC has a blanking time and 1H time that are one-time programmable parameters. 1H time is the time that DDIC needs to refresh the pixels, whereas the blanking time is the time in which the DDIC of the wearable device receives pixel data of the image from the SOC. In the normal orientation, the writing of the DDIC overlaps the 1H time because the reading and writing were in the same direction. However, when rotating the device 90-degrees, it is impossible to write something in 1H time without tearing the image.

Accordingly, the present disclosure is directed to a wearable computing device having at least one processor configured to address the aforementioned issues. In particular, the processor(s) of the wearable computing device reduces or eliminates the tearing effect by starting transmission of the image pixels when the blanking time starts and ending the transmission before 1H time starts, such that the image is not displayed on the display until all of the image pixels are transferred.

With reference now to the Figures, example embodiments of the present disclosure will be discussed in further detail.

Example Devices and Systems

Figure 4:
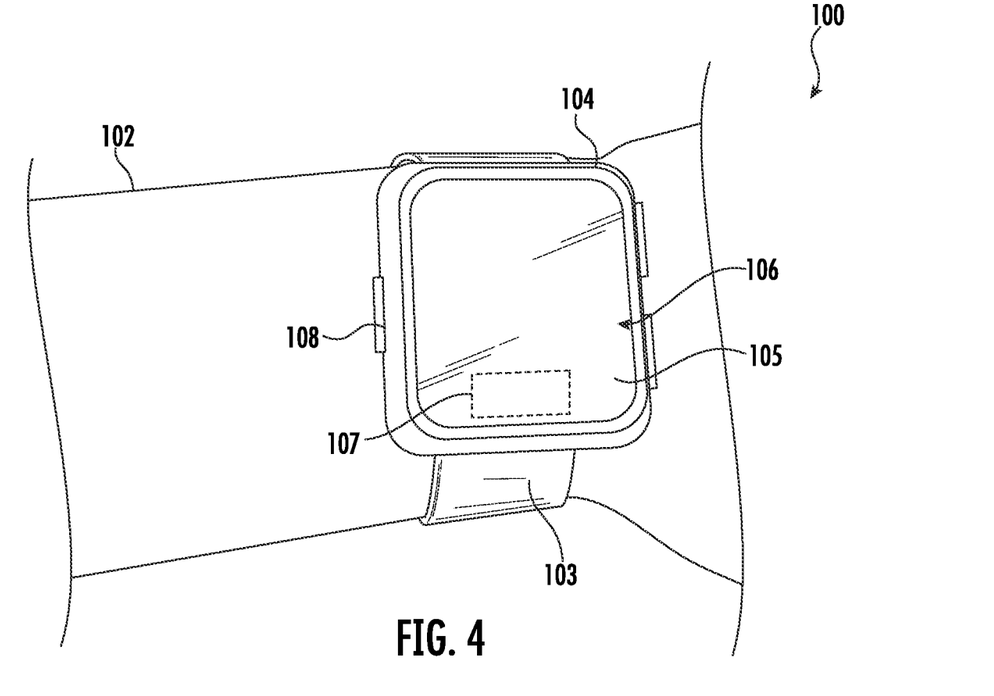
FIG. 4 provides a perspective view of a wearable computing device on a wrist of a user according to one embodiment of the present disclosure.
Figure 5:
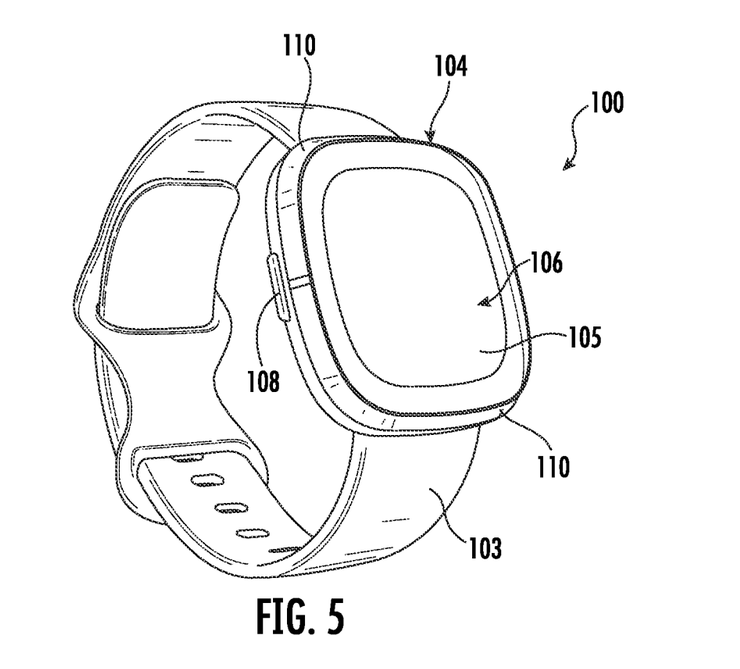
FIG. 5 provides a front perspective view of a wearable computing device according to one embodiment of the present disclosure.
Figure 6:
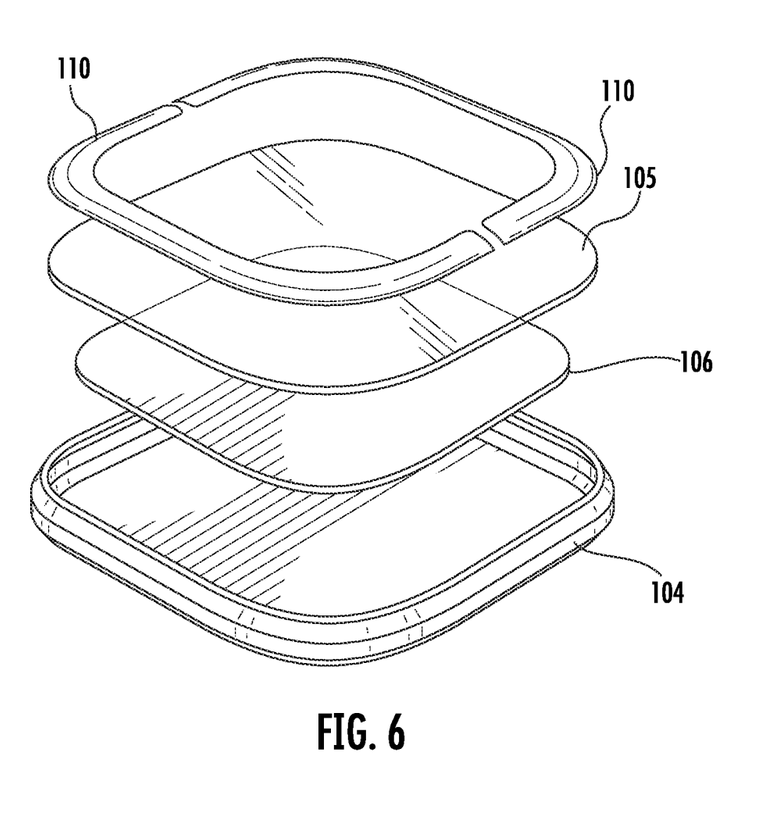
FIG. 6 provides an exploded view of the display of the wearable computing device of FIG. 5.

Referring now to the drawings, FIGS. 4-6 illustrate various views of a wearable computing device 100 according to the present disclosure. In particular, as shown in FIG. 4, the wearable computing device 100 may be worn on a user's forearm 102 like a wristwatch. Thus, as shown in FIGS. 4 and 5, the wearable computing device 100 may include a wristband 103 for securing the wearable computing device 100 to the user's forearm 102. In addition, as shown in FIGS. 4-6, the wearable computing device 100 has an outer covering 105 and a housing 104 that contains the electronics associated with the wearable computing device 100. For example, in an embodiment, the outer covering 105 may be constructed of glass, polycarbonate, acrylic, or similar. Further, as shown in FIGS. 4-6, the wearable computing device 100 includes an electronic display 106 arranged within the housing 104 and viewable through the outer covering 105. Moreover, as shown in FIG. 4, the wearable computing device 100 includes a display drive integrated circuit (DDIC) 107 having one or more processors communicatively coupled to the electronic display 106 and/or one or more memory devices storing instructions that when executed by the one or more processors cause the one or more processors to perform operations, as described later herein. Furthermore, as shown in FIGS. 4 and 5, the wearable computing device 100 may also include one or more buttons 108 that may be implemented to provide a mechanism to activate various sensors of the wearable computing device 100 to collect certain health data of the user. Moreover, in an embodiment, the electronic display 106 may cover an electronics package (not shown), which may also be housed within the housing 104.

Referring particularly to FIGS. 5 and 6, the wearable computing device 100 may further include one or more biometric sensor electrodes 110 for measuring various parameters of the user. For example, in an embodiment, the biometric sensor electrode(s) 110 may include a variety of sensors for measuring multiple biological parameters that can be beneficial to a user of the device, such as a heart rate sensor, multi-purpose electrical sensors compatible with electrocardiogram (ECG) and electrodermal activity (EDA) applications, red and infrared sensors, a gyroscope, an altimeter, an accelerometer, a temperature sensor (such as an ambient temperature sensor or a skin temperature sensor), a humidity sensor, a light sensor, a pressure sensor, Wi-Fi, GPS, a vibration or haptic feedback sensor, a speaker, or a photoplethysmogram (PPG) sensor, and a microphone, among others.

Figure 7:
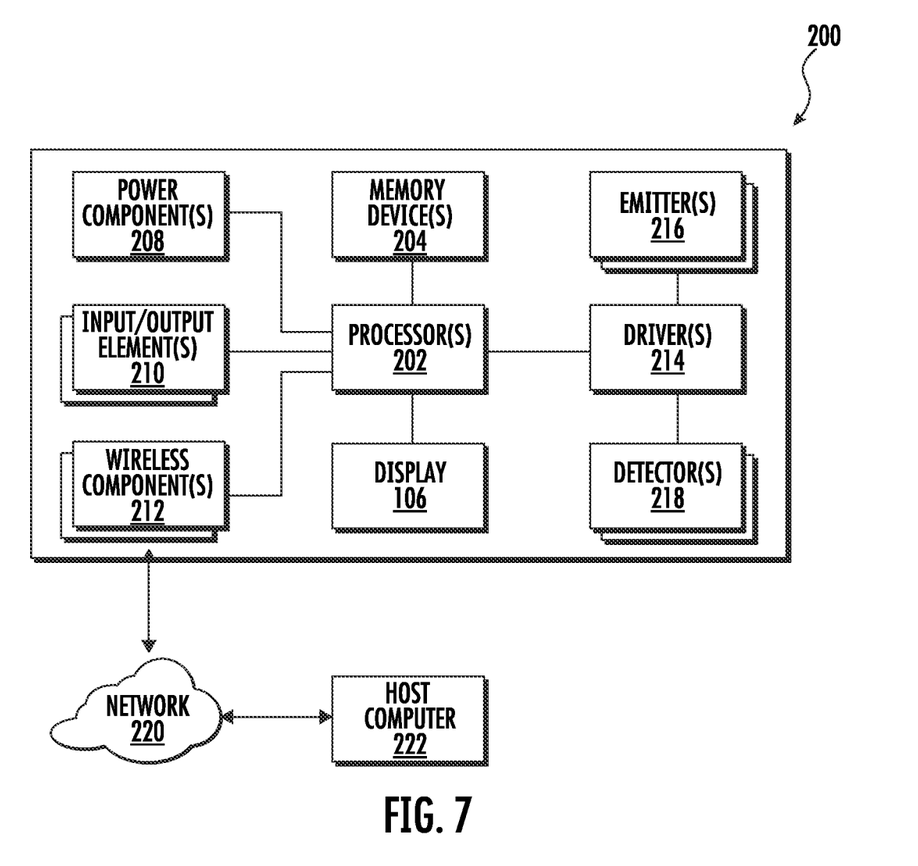
FIG. 7 provides a schematic diagram of an example set of devices that are able to communicate according to one embodiment of the present disclosure.

Referring now to FIG. 7, components of an example system 200 of the wearable computing device 100 that can be utilized in accordance with various embodiments are illustrated. In particular, as shown and as mentioned, the system 200 may also include at least one processor 202, which may be part of the DDIC 107 described with respect to FIG. 4. In such embodiments, the processor(s) may be a central processing unit (CPU) or graphics processing unit (GPU) for executing instructions that can be stored in a memory device 204, such as flash memory or DRAM, among other such options. For example, in an embodiment, the memory device 204 may include RAM, ROM, FLASH memory, or other non-transitory digital data storage, and may include a control program comprising sequences of instructions which, when loaded from the memory device 204 and executed using the processor(s) 202, cause the processor(s) 202 to perform the functions that are described herein. As would be apparent to one of ordinary skill in the art, the system 200 can include many types of memory, data storage, or computer-readable media, such as data storage for program instructions for execution by the controller or any suitable processor. The same or separate storage can be used for images or data, a removable memory can be available for sharing information with other devices, and any number of communication approaches can be available for sharing with other devices. In addition, as shown, the system 200 includes any suitable display 106, such as a touch screen, organic light emitting diode (OLED), or liquid crystal display (LCD), although devices might convey information via other means, such as through audio speakers, projectors, or casting the display or streaming data to another device, such as a mobile phone, wherein an application on the mobile phone displays the data.

The system 200 may also include one or more wireless components 212 operable to communicate with one or more electronic devices within a communication range of the particular wireless channel. The wireless channel can be any appropriate channel used to enable devices to communicate wirelessly, such as Bluetooth, cellular, NFC, Ultra-Wideband (UWB), or Wi-Fi channels. It should be understood that the system 200 can have one or more conventional wired communications connections as known in the art.

The system 200 also includes one or more power components 208, such as may include a battery operable to be recharged through conventional plug-in approaches, or through other approaches such as capacitive charging through proximity with a power mat or other such device. In further embodiments, the system 200 can also include at least one additional I/O element 210 able to receive conventional input from a user. This conventional input element can include, for example, a push button, touch pad, touch screen, wheel, joystick, keyboard, mouse, keypad, or any other such device or element whereby a user can input a command to the system 200. In another embodiment, the I/O element(s) 210 may be connected by a wireless infrared or Bluetooth or other link as well in some embodiments. In some embodiments, the system 200 may also include a microphone or other audio capture element that accepts voice or other audio commands. For example, in particular embodiments, the system 200 may not include any buttons at all, but might be controlled only through a combination of visual and audio commands, such that a user can control the wearable computing device 100 without having to be in contact therewith. In certain embodiments, the I/O elements 210 may also include one or more of the biometric sensor electrodes 110 described herein, optical sensors, barometric sensors (e.g., altimeter, etc.), and the like.

Still referring to FIG. 7, the system 200 may also include a driver 214 and at least some combination of one or more emitters 216 and one or more detectors 218 for measuring data for one or more metrics of a human body, such as for a person wearing the wearable computing device 100. In some embodiments, this may involve at least one imaging element, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Further image capture elements may also include depth sensors. Methods for capturing images using a camera element with a computing device are well known in the art and will not be discussed herein in detail. It should be understood that image capture can be performed using a single image, multiple images, periodic imaging, continuous image capturing, image streaming, etc. Further, the system 200 can include the ability to start and/or stop image capture, such as when receiving a command from a user, application, or other device.

Moreover, in an embodiment, the emitters 216 and detectors 218 may be coupled to the processor(s) 202 directly or indirectly using driver circuitry by which the processor(s) 202 may drive the emitters 216 and obtain signals from the detectors 218. Thus, as shown, a host computer 222 can communicate with the wireless networking components 212 via the one or more networks 220, which may include one or more local area networks, wide area networks, UWB, and/or internetworks using any of terrestrial or satellite links. In some embodiments, the host computer 222 executes control programs and/or application programs that are configured to perform some of the functions described herein.

Figure 8:
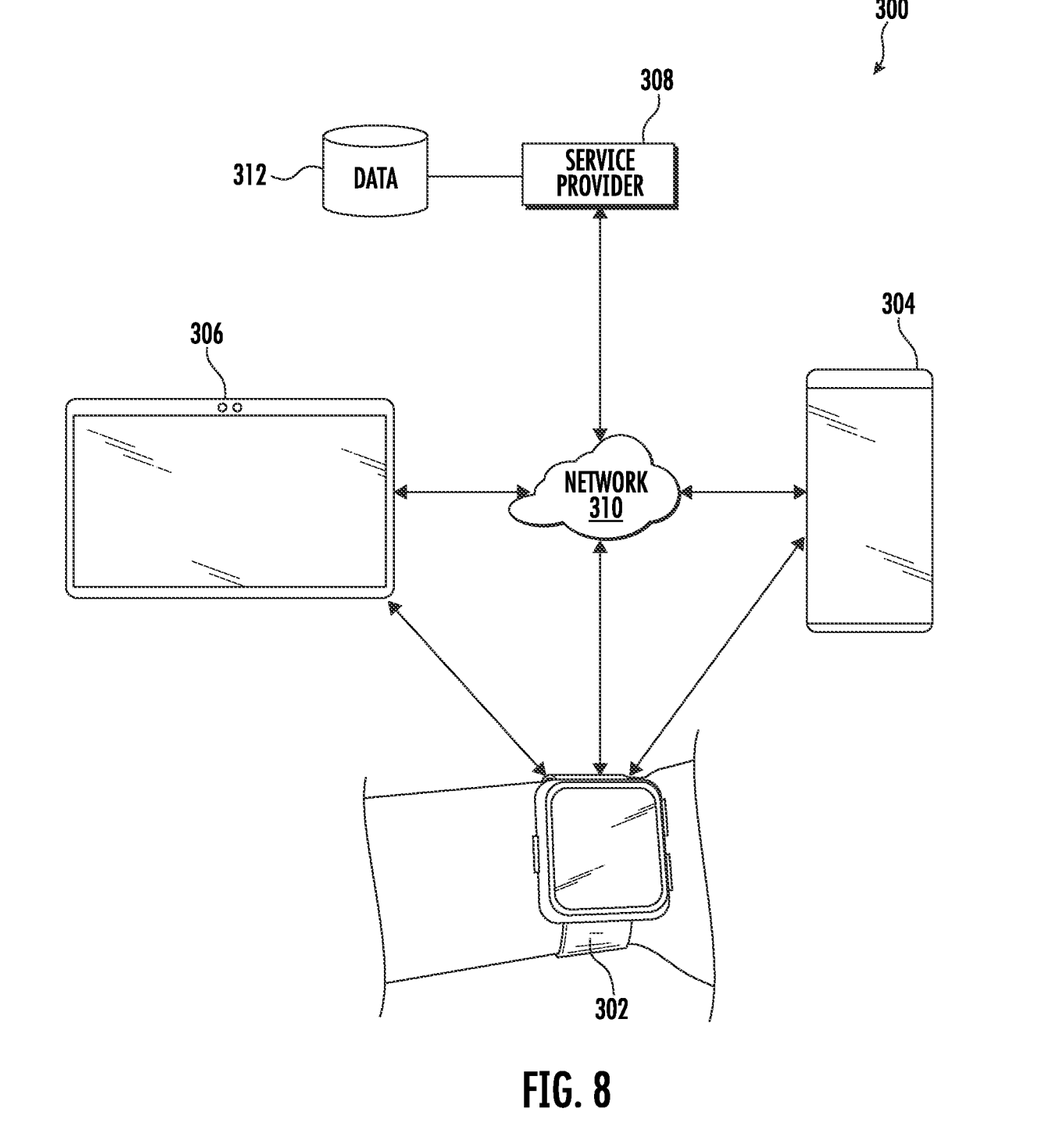
FIG. 8 illustrates various controller components of an example system that can be utilized according to one embodiment of the present disclosure.

Referring now to FIG. 8, a schematic diagram of an environment 300 in which aspects of various embodiments can be implemented is illustrated. In particular, as shown, a user might have a number of different devices that are able to communicate using at least one wireless communication protocol. For example, as shown, the user might have a smartwatch 302 or fitness tracker (such as wearable computing device 100), which the user would like to be able to communicate with a smartphone 304 and a tablet computer 306. The ability to communicate with multiple devices can enable a user to obtain information from the smartwatch 302, e.g., data captured using a sensor on the smartwatch 302, using an application installed on either the smartphone 304 or the tablet computer 306. The user may also want the smartwatch 302 to be able to communicate with a service provider 308, or other such entity, that is able to obtain and process data 312 from the smartwatch 302 and/or provide functionality that may not otherwise be available on the smartwatch 302 and/or the applications installed on the individual devices. In addition, as shown, the smartwatch 302 may be able to communicate with the service provider 308 through at least one network 310, such as the Internet or a cellular network, or may communicate over a wireless connection such as Bluetooth® to one of the individual devices, which can then communicate over the at least one network. There may be a number of other types of, or reasons for, communications in various embodiments.

In addition to being able to communicate, a user may also want the devices to be able to communicate in a number of ways or with certain aspects. For example, the user may want communications between the devices to be secure, particularly where the data may include personal health data or other such communications. The device or application providers may also be required to secure this information in at least some situations. The user may want the devices to be able to communicate with each other concurrently, rather than sequentially. This may be particularly true where pairing may be required, as the user may prefer that each device be paired at most once, such that no manual pairing is required. The user may also desire the communications to be as standards-based as possible, not only so that little manual intervention is required on the part of the user but also so that the devices can communicate with as many other types of devices as possible, which is often not the case for various proprietary formats. A user may thus desire to be able to walk in a room with one device and have such device automatically communicate with another target device with little to no effort on the part of the user. In various conventional approaches, a device will utilize a communication technology such as Wi-Fi to communicate with other devices using wireless local area networking (WLAN). Smaller or lower capacity devices, such as many Internet of Things (IoT) devices, instead utilize a communication technology such as Bluetooth®, and in particular Bluetooth Low Energy (BLE) which has very low power consumption.

In further embodiments, the environment 300 illustrated in FIG. 8 enables data to be captured, processed, and displayed in a number of different ways. For example, data may be captured using sensors on the smartwatch 302, but due to limited resources on the smartwatch 302, the data may be transferred to the smartphone 304 or the service provider 308 (or a cloud resource) for processing, and results of that processing may then be presented back to that user on the smartwatch 302, smartphone 304, and/or another such device associated with that user, such as the tablet computer 306. In at least some embodiments, a user may also be able to provide input such as health data using an interface on any of these devices, which can then be considered when making that determination.

Figure 9:
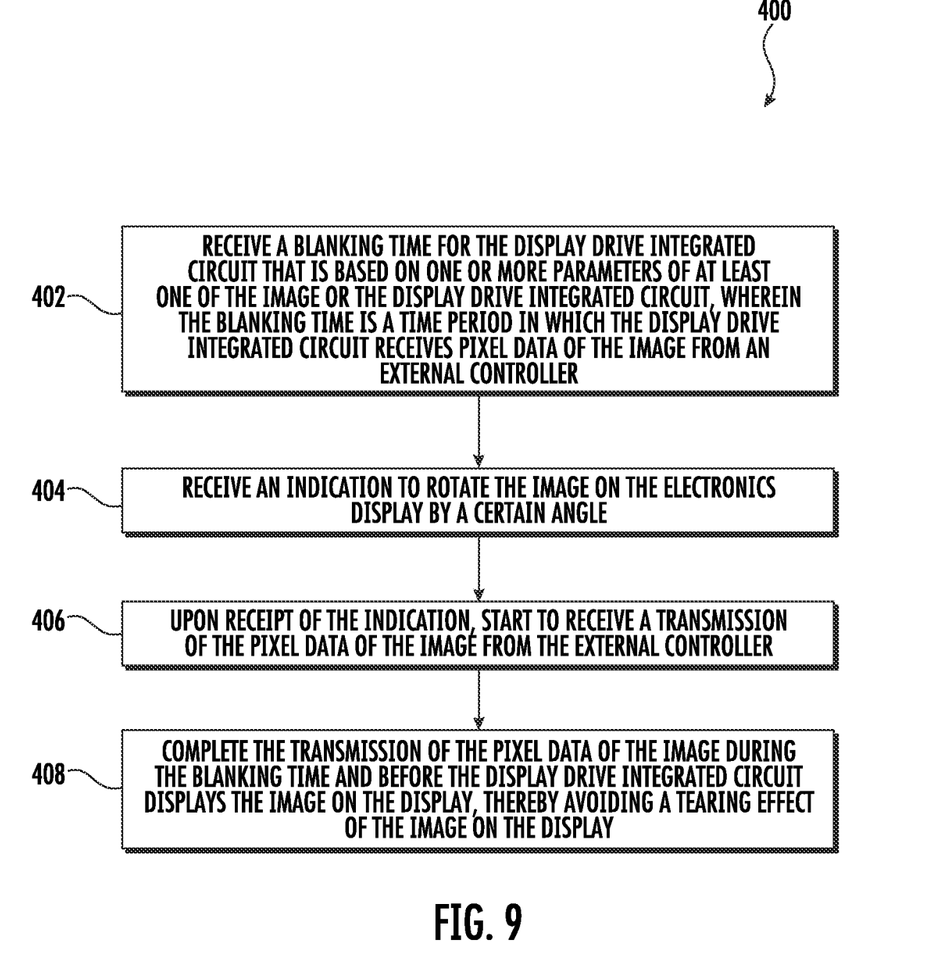
FIG. 9 illustrates a flow diagram of one embodiment of a method for reducing or eliminating a tearing effect of an image on an electronics display of a wearable computing device according to the present disclosure.

Referring now to FIG. 9, a flow diagram of one embodiment of a method 400 for reducing or eliminating a tearing effect of an image on an electronics display of a wearable computing device, such as the wearable computing device 100, is provided. In an embodiment, for example, the wearable computing device may be any suitable wearable computing device such as the wearable computing device 100 described herein with reference to FIGS. 1-8. In general, the method 400 is described herein with reference to the wearable computing device 100 of FIGS. 1-8. However, it should be appreciated that the disclosed method 400 may be implemented with any other suitable wearable computing device having any other suitable configurations. In addition, although FIG. 9 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown at (402), the method 400 includes receiving a blanking time for the DDIC 107 that is based on one or more parameters of at least one of the image on the electronics display 106 or the DDIC 107. As used herein, the blanking time generally refers to a time period in which the DDIC 107 receives pixel data of the image from an external controller, such as a motherboard. Accordingly, in an embodiment, the memory device(s) 204 described herein may include a blanking time programmed therein that is based on one or more parameters of at least one of the image or the DDIC 107. Moreover, in an embodiment, the parameter(s) of the image may include, for example, a resolution of the image or color data associated with the image. More particularly, in an embodiment, wherein the color data associated with the image may include a color depth of the image. In another embodiment, the resolution of the image may include a vertical resolution of the image or a horizontal resolution of the image. In still another embodiment, the parameter(s) of the DDIC 107 may include, at least, a maximum speed that the DDIC 107 can process the image in a frame.

Still referring to FIG. 9, as shown at (404), the method 400 includes receiving an indication to rotate the image on the electronics display 106 by a certain angle. For example, in an embodiment, the certain angle may be about 90 degrees. In further embodiments, the certain angle may be any suitable angle ranging from greater than 0 degrees to less than 90 degrees. Upon receipt of the indication, as shown at (406), the method 400 includes starting to receive a transmission of the pixel data of the image from the external controller. As shown at (408), the method 400 includes completing the transmission of the pixel data of the image during the blanking time and before the DDIC 107 displays the image on the electronics display 106 so as to avoid a tearing effect of the image on the electronics display 106.

Figure 10:
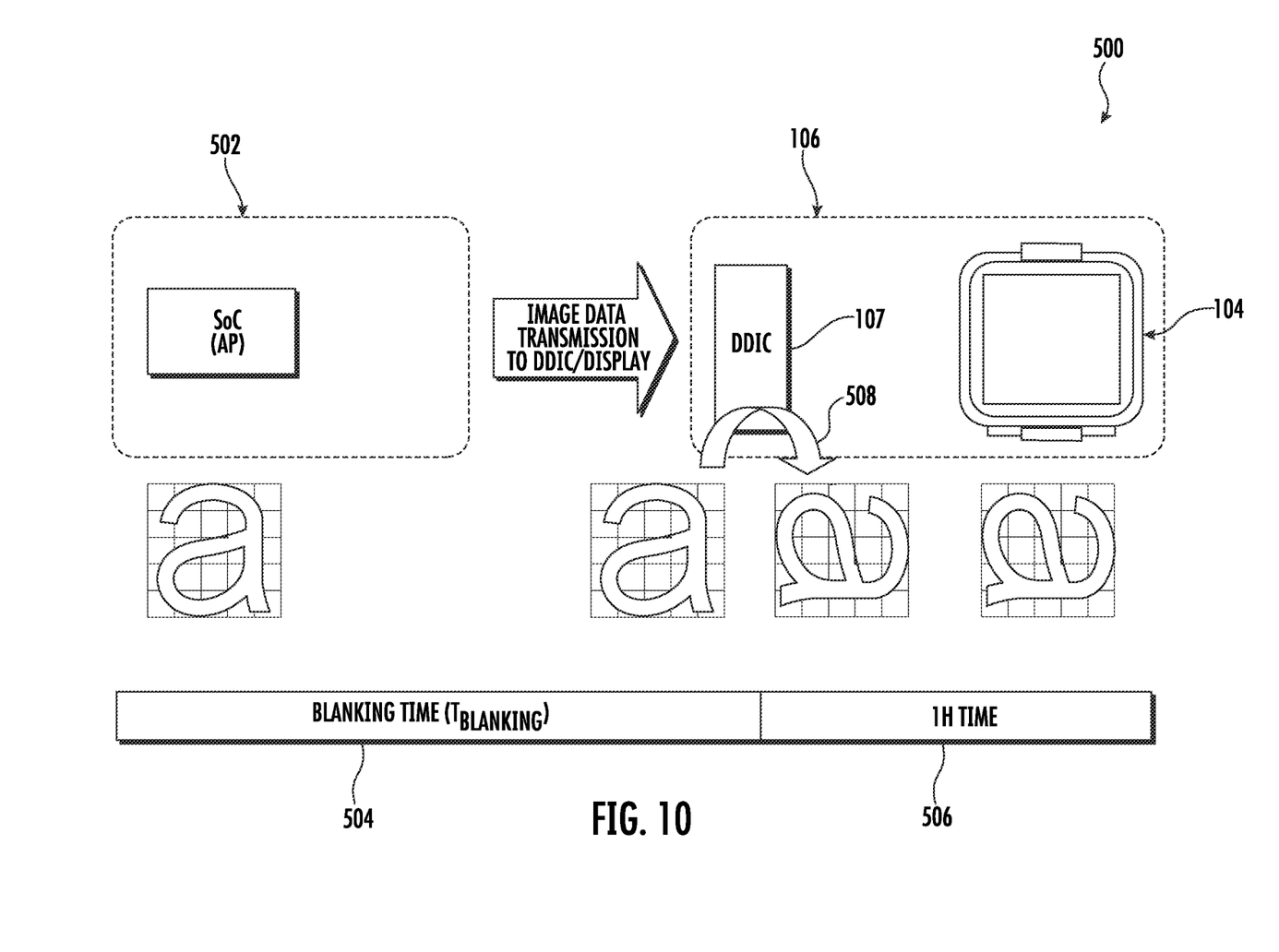
FIG. 10 provides a schematic diagram of an image rotation process for the display of a wearable computing device according to one embodiment of the present disclosure.
Figure 11:
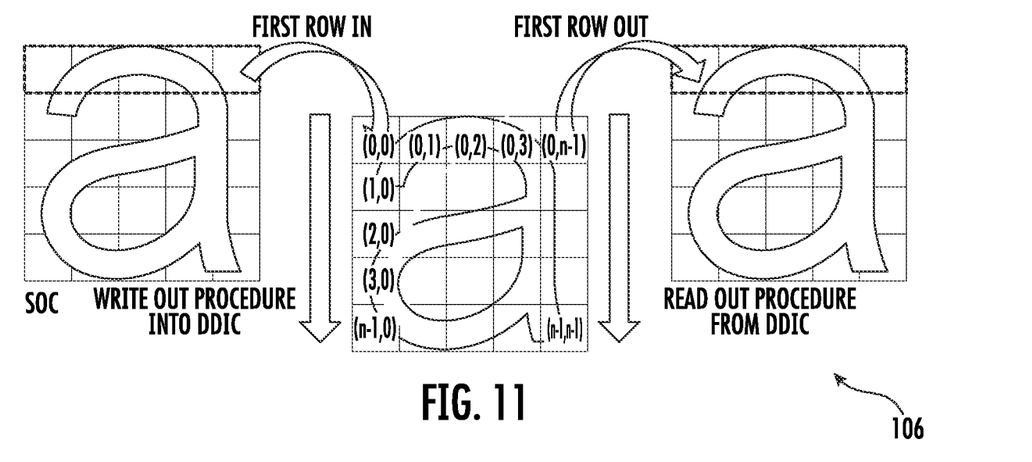
FIG. 11 provides a first-row-in-first-row-out image data process flow in a display of a wearable computing device according to one embodiment of the present disclosure.
Figure 12:
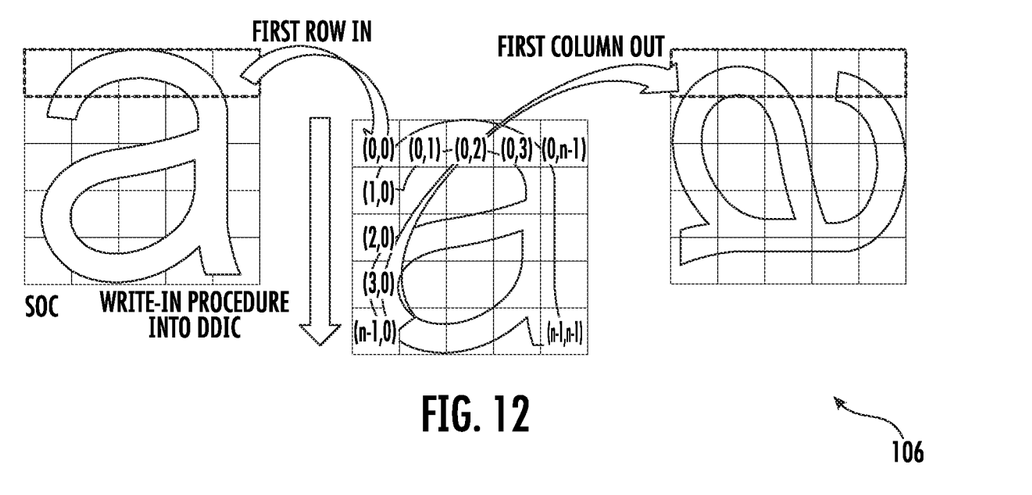
FIG. 12 provides a first-row-in-first-column-out image data process flow in a display of a wearable computing device according to one embodiment of the present disclosure.

The method 400 of FIG. 9 can be better understood with respect to FIGS. 10-12. For example, as shown in FIG. 10, a schematic diagram 500 of the image rotation process from an external controller 502 to the electronics display 106, which contains the DDIC 107, is illustrated. In conventional wearable devices, the DDIC 107 has a blanking time 504 (i.e., TBlanking) and a 1H time 506 that are one-time programmable. The 1H time 506 is the time that DDIC 107 needs to refresh the pixels of the image (also referred to herein as the refresh time), whereas the blanking time 504 is the time in which the DDIC 107 does not update pixels from internal RAM. Thus, as shown, in the normal orientation, the writing of the DDIC 107 overlaps the 1H time 506 because the reading and writing of the pixels of the image are in the same direction. However, for conventional devices, when the image is rotated by 90 degrees, as shown at arrow 508, it is impossible to write the image in the 1H time 506 without tearing the image. Thus, the present disclosure is directed to a system and method in which the image writing occurs within the timeframe set by the blanking time 504 and ends before 1H time 506 starts, as the sum of the 1H time 506 and the blanking time 504 is equal to one refresh cycle.

Thus, in an embodiment, as shown in FIG. 11, for standard image processing (i.e., without the image rotation), the DDIC 107 follows a "first input first output" (FIFO). In such scenarios, standard image processing does not create a tearing effect. In contrast, as shown in FIG. 12, for the 90-degree rotated image, this rule does not apply anymore because the image data input follows a row-by-row rule, whereas the image data output follows a "column by column" rule. Thus, in such embodiments, if the image data input does not transmit up to (n−1, 0) before the "first column out" time, then the tearing effect will appear (see e.g., FIG. 3).

Accordingly, in the present disclosure, the process of starting to receive the transmission of the pixel data of the image from the external controller 502 may include receiving row-by-row image data input corresponding to each row of the image and converting the row-by-row image data input to column-by-column data output corresponding to each column of the image so as to rotate the image. Thus, in particular embodiments, the method 400 may further include converting the row-by-row image data input to column-by-column data output after receiving the row-by-row image data input up to (n−1, 0) to avoid the tearing effect of the image on the display, wherein (n−1, 0) represents a last row in the row-by-row image data input. As such, in an embodiment, the process of completing the transmission of the pixel data of the image before the DDIC 107 displays the image on the electronics display 106 may include completing the transmission of the pixel data of the image before a refresh time of the DDIC 107 begins such that a sum of the blanking time and the refresh time is equal to or less than one refresh cycle of the image.

Accordingly, in such embodiments, to reserve the affordable time for the first-row-in image data transmission to the DDIC 107 before the process begins the "first-column out" transmission, the blanking time setting is the critical factor because the "first-column out" transmission will occur when the blanking time is over. Thus, in the present disclosure, to calculate the desired blanking time, Equation (1) below may be used:

$$f(\# \text{ of data}) = H \text{ resolution} \times V \text{ resolution} \times (\text{color depth bit}) \pm (\text{Mbits/sec}) \qquad \text{Equation (1)}$$

where H resolution is the horizontal resolution of the image, and
V resolution is the vertical resolution of the image.

Thus, in an embodiment, the system and method of the present disclosure provide a safe zone or margin in the blanking time against its components capabilities, e.g., the display resolution (e.g., H resolution, V resolution), data transfer speed (Mbits/sec), and so on.

Figure 13:
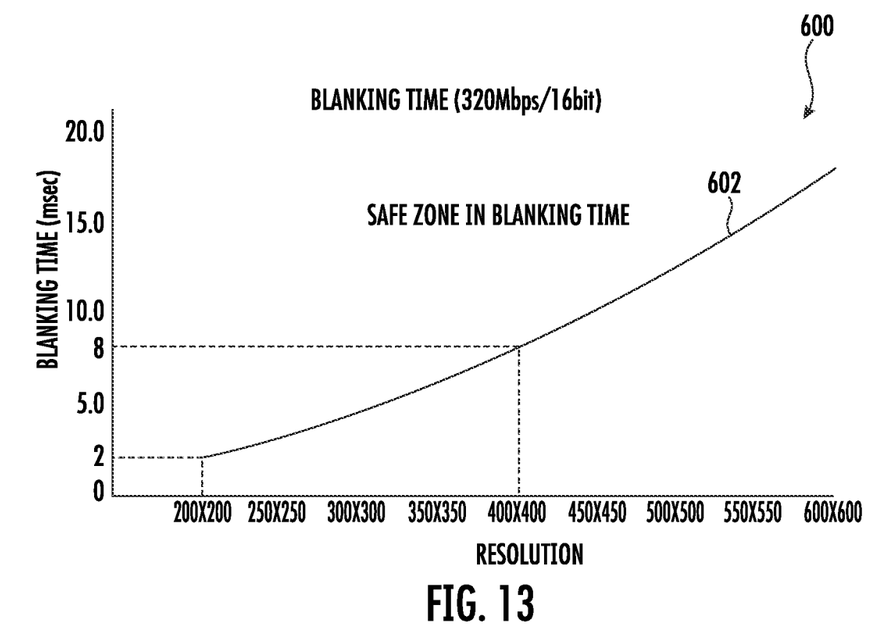
FIG. 13 provides a graphical representation of the blanking time (y-axis) versus image resolution (x-axis) for a processing speed of 320 Mbps and a 16 bit image according to one embodiment of the present disclosure.

Referring now to FIGS. 13-16, various graphs are illustrated to provide examples of the safe zone or margin for the blanking time for various DDICs according to the present disclosure. In particular, as shown in FIG. 13, a graph 600 of the blanking time (y-axis) versus image resolution (x-axis) for a DDIC that can process up to 320 Mbps speed and has a 16-bit color depth is illustrated according to the present disclosure. Further, as shown, the safe zone in the blanking time is illustrated by curve 602, in which any blanking time above curve 602 will not experience a tearing effect. In particular, as shown, for the 16-bit color depth, the image generally requires a 2-millisecond blanking time at 200×200 resolution and an 8-millisecond blanking time at 400×400 resolution, and so on.

Figure 14:
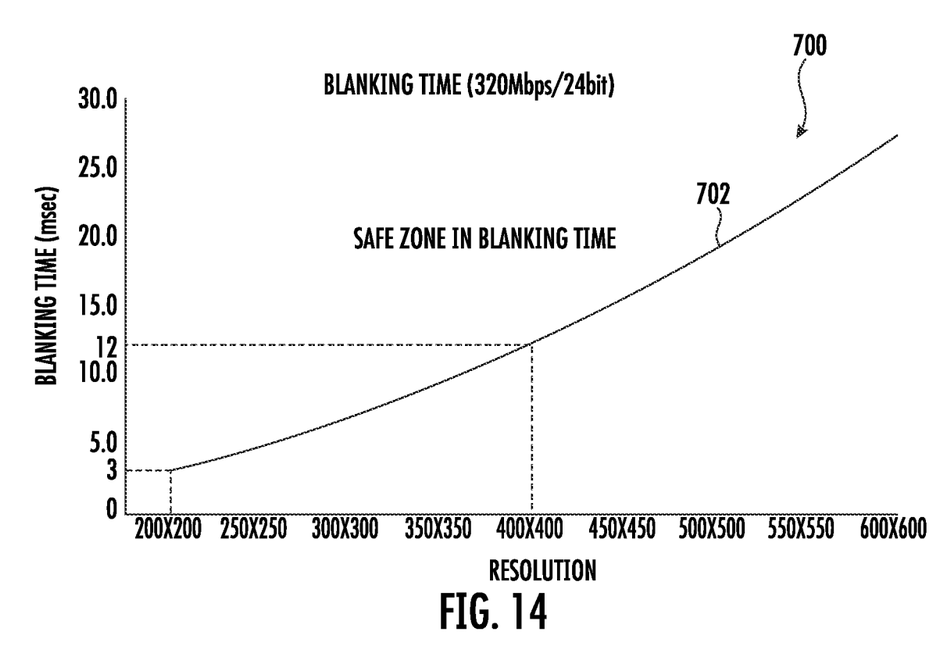
FIG. 14 provides a graphical representation of the blanking time (y-axis) versus image resolution (x-axis) for a processing speed of 320 Mbps and a 24 bit image according to one embodiment of the present disclosure.

As shown in FIG. 14, a graph 700 of the blanking time (y-axis) versus image resolution (x-axis) for a DDIC that can process up to 320 Mbps speed and has a 24-bit color depth is illustrated according to the present disclosure. Further, as shown, the safe zone in the blanking time is illustrated by curve 702, in which any blanking time above curve 702 will not experience a tearing effect. Thus, as shown, for the 24-bit color depth, the blanking time requires 3 milliseconds at 200×200 resolution and 12 milliseconds at 400×400 resolution.

Figure 15:
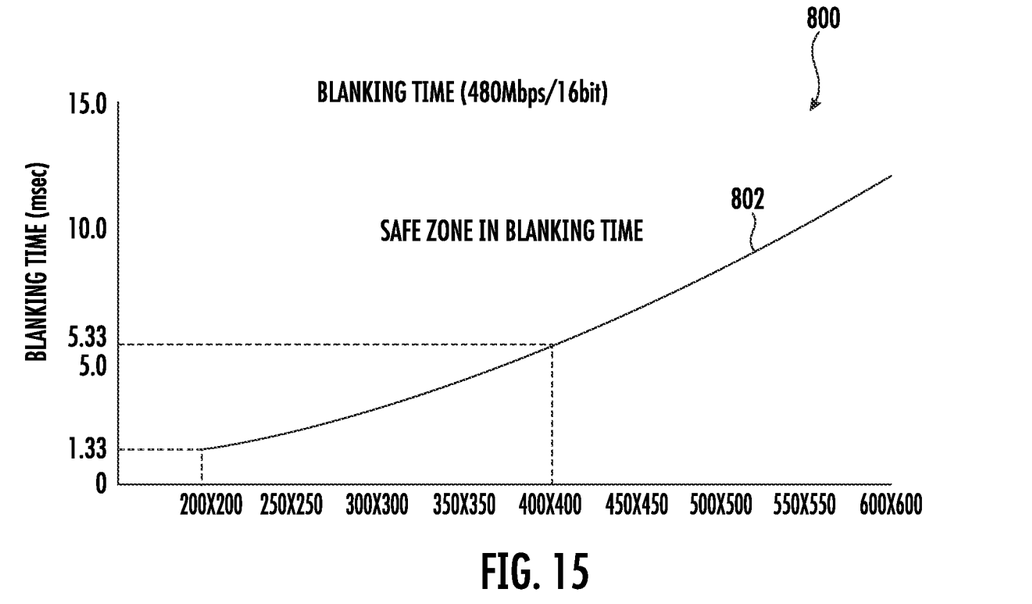
FIG. 15 provides a graphical representation of the blanking time (y-axis) versus image resolution (x-axis) for a processing speed of 480 Mbps and a 16-bit image according to one embodiment of the present disclosure.
Figure 16:
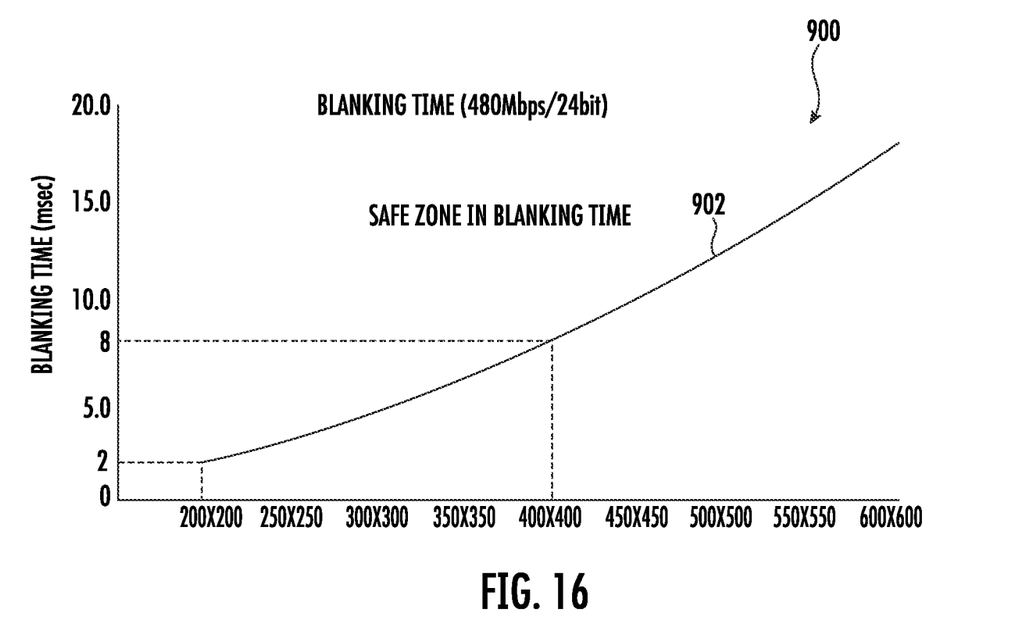
FIG. 16 provides a graphical representation of the blanking time (y-axis) versus image resolution (x-axis) for a processing speed of 480 Mbps and a 24-bit image according to one embodiment of the present disclosure.

Referring particularly to FIGS. 15 and 16, further graphs are provided for 480 Mbps for a 16-bit and a 24-bit image for comparing with FIGS. 13 and 14. In particular, as shown in FIG. 15, a graph 800 of the blanking time (y-axis) versus image resolution (x-axis) for a DDIC that can process up to 480 Mbps speed and has a 16-bit color depth is illustrated according to the present disclosure. Further, as shown, the safe zone in the blanking time is illustrated by curve 802, in which any blanking time above curve 802 will not experience a tearing effect. As shown in FIG. 16, a graph 900 of the blanking time (y-axis) versus image resolution (x-axis) for a DDIC that can process up to 480 Mbps speed and has a 24-bit color depth is illustrated according to the present disclosure. Further, as shown, the safe zone in the blanking time is illustrated by curve 902, in which any blanking time above curve 902 will not experience a tearing effect. FIGS. 13-16 are provided as examples only and are not meant to be limited. In the 16-bit color depth, a 1.33-millisecond blanking time is needed at 200×200 resolution, whereas 5.33-millisecond blanking time is required at 400×400 resolution. In the 24-bit color depth, a 2-millisecond blanking time is needed at 200×200 resolution, whereas an 8-millisecond blanking time is needed at 400×400 resolution. In other words, as illustrated, when color depth is increased (e.g., 16-bit to 24-bit), the blanking time increases because the higher color depth (bit) indicates an increased amount of data. Further, when data speed is increased (e.g., from 320 Mbps to 480 Mbps), the blanking time becomes shorter because the faster speed can carry more data in the same period of time. Moreover, one having ordinary skill in the art would understand that further speeds and color depths may be accommodated by the systems and methods of the present disclosure described herein.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A wearable computing device, comprising:
an outer covering;
a housing;
an electronic display arranged within the housing and configured to display an image viewable through the outer covering; and
a display drive integrated circuit comprising one or more processors communicatively coupled to the electronic display and one or more memory devices storing instructions that when executed by the one or more processors cause the one or more processors to perform operations, the one or more memory device comprising a blanking time programmed therein that is based on one or more parameters of at least one of the image or the display drive integrated circuit, the one or more parameters of the display drive integrated circuit comprising, at least, a maximum speed that the display drive integrated circuit can process the image in a frame, the blanking time being a time period in which the display drive integrated circuit receives pixel data of the image from an external controller without displaying the image on the electronics display, the operations comprising:
receiving an indication to rotate the image on the electronics display by a certain angle;
upon receipt of the indication, starting to receive a transmission of the pixel data of the image from the external controller; and
completing the transmission of the pixel data of the image during the blanking time and before the display drive integrated circuit displays the image on the electronic display so as to avoid a tearing effect of the image on the electronic display.

2. The wearable computing device of claim 1, wherein the one or more parameters of at least one of the image comprise at least one of at least one resolution of the image or color data associated with the image.

3. The wearable computing device of claim 2, wherein the color data associated with the image comprises a color depth of the image.

4. The wearable computing device of claim 2, wherein the at least one resolution of the image comprises at least one of a vertical resolution of the image or a horizontal resolution of the image.

5. The wearable computing device of claim 1, wherein the certain angle comprises 90 degrees.

6. The wearable computing device of claim 1, wherein starting to receive the transmission of the pixel data of the image from the external controller further comprises:
receiving row-by-row image data input corresponding to each row of the image; and
converting the row-by-row image data input to column-by-column data output corresponding to each column of the image so as to rotate the image.

7. The wearable computing device of claim 6, wherein operations further comprises converting the row-by-row image data input to column-by-column data output after receiving the row-by-row image data input up to (n−1, 0) to avoid the tearing effect of the image on the display, wherein (n−1, 0) represents a last row in the row-by-row image data input.

8. The wearable computing device of claim 1, wherein completing the transmission of the pixel data of the image before the display drive integrated circuit displays the image on the display further comprises:
completing the transmission of the pixel data of the image before a refresh time of the display drive integrated circuit begins such that a sum of the blanking time and the refresh time is equal to or less than one refresh cycle of the image.

9. A computer-implemented method for reducing or eliminating a tearing effect of an image on an electronics display of a wearable computing device, the wearable computing device having a display drive integrated circuit, the computer-implemented method comprising:
receiving a blanking time for the display drive integrated circuit that is based on one or more parameters of at least one of the image or the display drive integrated circuit, the one or more parameters of the display drive integrated circuit comprising, at least, a maximum speed that the display drive integrated circuit can process the image in a frame, wherein the blanking time is a time period in which the display drive integrated circuit receives pixel data of the image from an external controller;
receiving an indication to rotate the image on the electronics display by a certain angle; upon receipt of the indication, starting to receive a transmission of the pixel data of the image from the external controller; and
completing the transmission of the pixel data of the image during the blanking time and before the display drive integrated circuit displays the image on the electronic display so as to avoid a tearing effect of the image on the electronic display.

10. The computer-implemented method of claim 9, wherein the one or more parameters of at least one of the image comprise at least one of at least one resolution of the image or color data associated with the image.

11. The computer-implemented method of claim 10, wherein the color data associated with the image comprises a color depth of the image.

12. The computer-implemented method of claim 10, wherein the at least one resolution of the image comprises at least one of a vertical resolution of the image or a horizontal resolution of the image.

13. The computer-implemented method of claim 9, wherein the certain angle comprises 90 degrees.

14. The computer-implemented method of claim 9, wherein starting to receive the transmission of the pixel data of the image from the external controller further comprises:
receiving row-by-row image data input corresponding to each row of the image; and converting the row-by-row image data input to column-by-column data output corresponding to each column of the image so as to rotate the image.

15. The computer-implemented method of claim 14, further comprising converting the row-by-row image data input to column-by-column data output after receiving the row-by-row image data input up to (n−1, 0) to avoid the tearing effect of the image on the display, wherein (n−1, 0) represents a last row in the row-by-row image data input.

16. One or more tangible, non-transitory, computer readable media that collectively store instructions that when executed by the one or more processors cause the one or more processors to perform operations, the operations comprising:

receiving a blanking time for a display drive integrated circuit of a wearable computing device that is based on one or more parameters of at least one of an image or the display drive integrated circuit, wherein the blanking time is a time period in which the display drive integrated circuit receives pixel data of the image from an external controller;

receiving an indication to rotate the image on an electronics display of the wearable computing device by a certain angle;

upon receipt of the indication, starting to receive a transmission of the pixel data of the image from the external controller; and     completing the transmission of the pixel data of the image during the blanking time and before the display drive integrated circuit displays the image on the electronic display so as to avoid a tearing effect of the image on the electronic display, wherein completing the transmission of the pixel data of the image before the display drive integrated circuit displays the image on the display further comprises: completing the transmission of the pixel data of the image before a refresh time of the display drive integrated circuit begins such that a sum of the blanking time and the refresh time is equal to or less than one refresh cycle of the image.

17. The one or more tangible, non-transitory, computer readable media of claim 16, wherein the one or more parameters of at least one of the image displayed by the wearable computing device or the display drive integrated circuit comprise at least one of at least one resolution of the image, color data associated with the image, or a maximum speed that the display drive integrated circuit can shift the image in a frame.

18. The one or more tangible, non-transitory, computer readable media of claim 16, wherein starting to receive the transmission of the pixel data of the image from the external controller further comprises:

receiving row-by-row image data input corresponding to each row of the image; and converting the row-by-row image data input to column-by-column data output after receiving the row-by-row image data input up to (n−1, 0) to avoid the tearing effect of the image on the display, wherein (n−1, 0) represents a last row in the row-by-row image data input.

* * * * *